Oct. 3, 1950     C. D. SCHERMULY ET AL     2,524,481
DRIFT RELEASE MECHANISM FOR PRESSES
Filed May 5, 1947     2 Sheets-Sheet 1

INVENTORS
CONRAD DAVID SCHERMULY
ALFRED JAMES SCHERMULY
CHARLES SCHERMULY
By their attorneys Howson and Howson Patented Oct. 3, 1950

2,524,481

UNITED STATES PATENT OFFICE 2,524,481

DRIFT RELEASE MECHANISM FOR PRESSES

Conrad David Schermuly, Alfred James Schermuly, and Charles Schermuly, Parkgate, Newdigate, England Application May 5, 1947, Serial No. 745,970
In Great Britain December 19, 1941

6 Claims. (Cl. 24—263)

This invention relates to drift release mechanism for presses, more particularly hydraulic presses, and has for its principal object to provide mechanism which is simple in operation and more easily constructed than the mechanism hitherto used.

The present invention consists in drift release mechanism comprising a drift, an axially bored body member, having a part of the boring tapered, secured to the press head, a gripping member having a tapered surface which coacts with the first-mentioned taper, inter-engaging means, such as screwthreads, on the drift and gripping member, spring means which tend to hold the gripping member into engagement with the drift and means for releasing the said gripping member from the said drift against the action of said spring means. Instead of providing screwthreads on the drift and the gripping member, complementary rings or grooves or other interengaging projections and recesses may be formed thereon.

A convenient form of the invention will hereinafter be described by way of example with reference to the accompanying drawing, in which.

Figure 1:
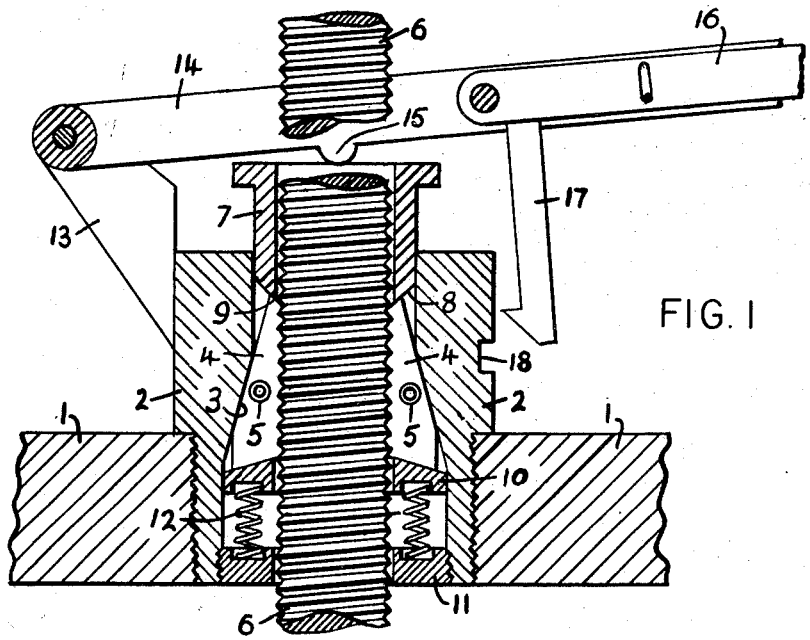
Figure 1 shows a section of the mechanism in the gripping position.

Referring to the drawing, 1 shows a part of the hydraulic press head into which is screwed the body member 2. The body member is axially bored and a part of the boring is tapered as shown at 3. Arranged within the body member is a gripping member 4 which, in the present instance, is divided into four equal parts 4a, 4b, 4c and 4d, each of the said parts being united by springs 5 positioned between contiguous surfaces of adjacent parts, which tend to force the parts away from each other. The inner surfaces of the divided member 4 are screw-threaded to enable them to engage the screw thread on the drift 6 when required.

Above the divided member 4 is arranged a collar 7 having a tapered end 8 engaging a taper 9 on the upper end of the member 4. The collar 7 is free to slide in the body member 2 and, since it has no internal thread, it can also slide on the drift 6. Below the divided member 4 is a plate 10, also having a tapered surface adapted to engage with a tapered surface on the lower end of the member 4. The plate 10 is also free to slide in the body member 2 and on the drift 6.

Screwed into the lower end of the body member 2 is a ring 11 provided with an axial boring having clearance with respect to the drift 6. This ring forms a bearing for the lower ends of springs 12, which normally hold the plate 10 from the ring 11 and at the same time hold the divided member 4 in engagement with the drift 6.

Secured to the upper end of the body member 2 is a bracket 13 to which is pivoted a bifurcated lever 14 having lugs 15 thereon adapted to engage the collar 7. Pivoted to the lever 14 is a second lever 16 having a pawl 17 secured thereto which is engaged at the required time, with the recess 18 formed in the body member 2.

Figure 2:
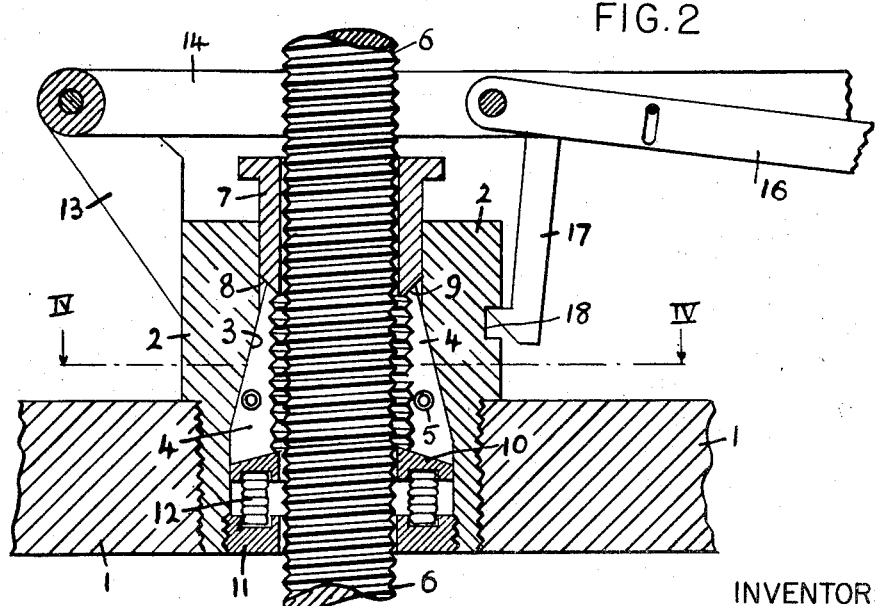
Figure 2 shows a section of the mechanism in the released position.
Figure 3:
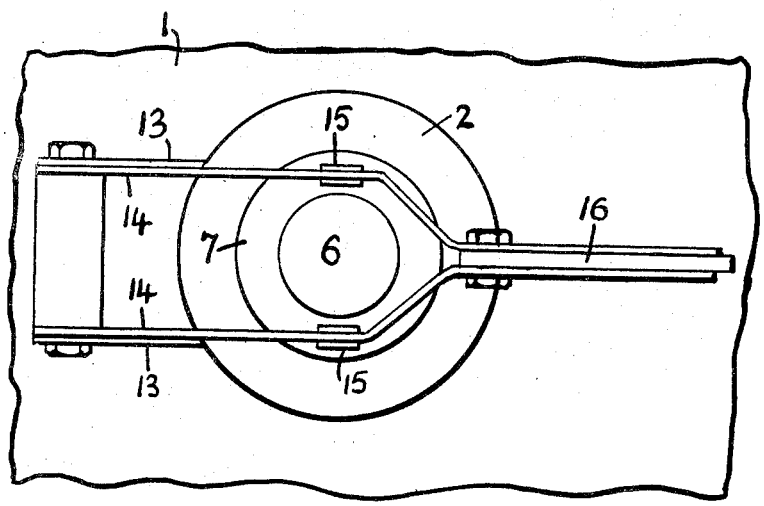
Figure 3 shows a plan of the mechanism.
Figure 4:
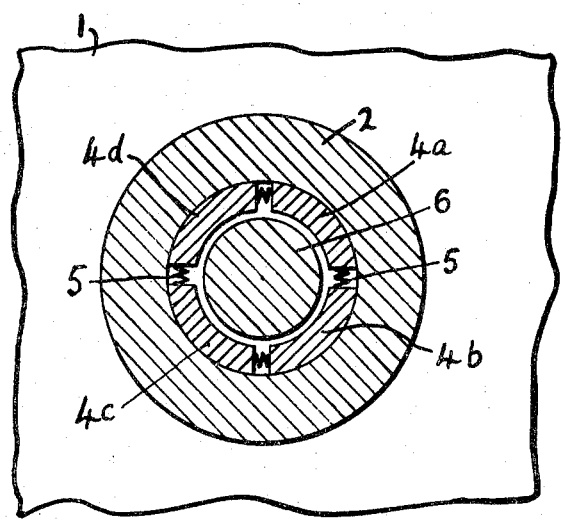
Figure 4 shows a section on the line IV—IV, Figure 2.

In operation, assuming the drift 6 is in the fixed or gripped position as shown in Figure 1, and it is desired to release the drift, the lever 14 is pressed downwardly and the lever 16 is allowed to fall so that the pawl 17 engages with the recess 18 as shown in Figure 2. When the lever 14 is moved in this manner the lugs 15 engaging with the collar 7 force the said collar downwardly, which in turn forces the divided member 4 downwardly; in addition the springs 5 force the divided portions of the said member 4 outwardly so that the said divided member slides downwardly and outwardly on the taper 3 in the body 2, thus disengaging the threads therein from the threads on the drift 6. The aforesaid pressure on the lever 14 is against the springs 12 which are compressed on to the ring 11 through the plate 10, so that the mechanism is in the position shown in Figure 2, in which position the drift 6 can be slidden from the press head 1.

In order to relock the drift 6 in the press head 1, the drift 6 is placed in the required position, the pawl 17 is released from the recess 18 whereupon the springs 12 automatically return the divided member 4 to the position shown in Figure 1, when the threads therein again engage with the threads on the drift 6.

In order to prevent twisting of the divided member 4 and the plate 10 when the lever 14 is depressed, suitable guides (not shown) may be provided on the plate 10 which project from the said plate through the ring 11.

It will be understood that instead of providing screw threads on the drift and the gripping member, other interengaging means, such as complementary rings or grooves, may be formed thereon.

Drift releasing mechanism in accordance with the present invention is of simple construction, all of the parts being easily formed and assembled, thereby reducing the time required to produce the mechanism, while at the same time the efficiency of operation is also ensured.

What we claim is:

1. Drift release mechanism comprising a drift, a press head, an axially bored body member secured to the press head and having a part of its boring tapered, a gripping member having an upper surface and a tapered side surface which coacts with the first mentioned taper, interengaging means on the drift and the gripping member, spring means which tend to hold said gripping member in engagement with the drift and means for releasing said gripping member from said drift against the action of said spring means, said releasing means comprising a collar which surrounds said drift and a tapered seating formed on the upper surface of said gripping member, said collar having an end face tapered to coact with said tapered seating.

2. Drift release mechanism as claimed in claim 1 wherein said end face is tapered inwardly toward the press head and said seating is tapered outwardly and away from the press head.

3. Drift release mechanism as claimed in claim 1, wherein said releasing means comprises a lever pivotally mounted on said body member, movement of said lever being adapted to force said collar and said gripping member downwardly against said spring means.

4. Drift release mechanism comprising a drift, a press head, an axially bored body member secured to said press head and having a part of its boring tapered, a gripping member having a lower surface tapered to form a seating and a tapered side surface which coacts with the tapered boring, spring means which tend to hold said gripping member in engagement with the drift, said spring means comprising a plate surrounding said drift and having a tapered face adapted to coact with said seating on the lower surface of said gripping member and means for releasing said gripping member from said drift against the action of said spring means.

5. Drift release mechanism as claimed in claim 4 wherein the lower surface of said gripping member is tapered outwardly toward the press head and the face of said plate is tapered inwardly away from the press head.

6. Drift release mechanism as claimed in claim 4 wherein said lever is held in the position corresponding to the disengagement of said interengaging means by means of a pawl pivoted to the lever which engages a recess in the body member.

CONRAD DAVID SCHERMULY.
ALFRED JAMES SCHERMULY.
CHARLES SCHERMULY.

REFERENCES CITED

The following references are of record in the file of this patent:

UNITED STATES PATENTS

| Number | Name | Date |
|---|---|---|
| 1,111,535 | Greve | Sept. 22, 1914 |
| 1,731,078 | Miller | Oct. 8, 1929 |
| 1,797,494 | Campbell | Mar. 24, 1931 |
| 1,817,386 | Maszczyk | Aug. 4, 1931 |
| 1,867,321 | Mc Evoy | July 12, 1932 |
| 1,972,635 | Whinnen | Sept. 4, 1934 |
| 2,126,933 | Stone et al. | Aug. 16, 1938 |
| 2,253,924 | Worthington | Aug. 26, 1941 |
| 2,410,589 | Segelhorst | Nov. 5, 1946 |